United States Patent
Revaud et al.

(10) Patent No.: US 11,715,215 B2
(45) Date of Patent: Aug. 1, 2023

(54) UNTRAINED SYSTEMS AND METHODS FOR VEHICLE SPEED ESTIMATION

(71) Applicant: NAVER CORPORATION, Gyeonggi-do (KR)

(72) Inventors: Jérome Revaud, Meylan (FR); Yohann Cabon, Montbonnot-Saint-Martin (FR)

(73) Assignee: NAVER CORPORATION, Gyeonggi-do (KR)

( * ) Notice: Subject to any disclaimer, the term of this patent is extended or adjusted under 35 U.S.C. 154(b) by 195 days.

(21) Appl. No.: 17/365,439

(22) Filed: Jul. 1, 2021

(65) Prior Publication Data
US 2023/0032420 A1    Feb. 2, 2023

(51) Int. Cl.
   G06T 7/246    (2017.01)
   G06T 7/285    (2017.01)
   G06T 7/277    (2017.01)
   G08G 1/052    (2006.01)

(52) U.S. Cl.
   CPC ............. *G06T 7/246* (2017.01); *G06T 7/277* (2017.01); *G06T 7/285* (2017.01); *G08G 1/052* (2013.01); *G06T 2207/10021* (2013.01); *G06T 2207/20084* (2013.01); *G06T 2207/30252* (2013.01)

(58) Field of Classification Search
   CPC ......... G06T 7/246; G06T 7/285; G06T 7/277; G06T 2207/10021; G06T 2207/20084; G06T 2207/30252; G08G 1/052
   USPC ....................................................... 382/103
   See application file for complete search history.

(56) References Cited

U.S. PATENT DOCUMENTS

| | | | |
|---|---|---|---|
| 2020/0293816 A1* | 9/2020 | Neser | G06V 20/182 |
| 2020/0364892 A1* | 11/2020 | Ko | G05D 1/0251 |
| 2020/0372679 A1* | 11/2020 | Javan Roshtkhari | H04N 23/80 |

OTHER PUBLICATIONS

Zhuang, B., & Chandraker, M. (2021). Fusing the Old with the New: Learning Relative Camera Pose with Geometry-Guided Uncertainty. arXiv preprint arXiv:2104.08278.
Dong, H., Wen, M., & Yang, Z. (2019). Vehicle Speed Estimation Based on 3D ConvNets and Non-Local Blocks. Future Internet, 11(6), 123.
A. Kurniawan, A. Ramadlan, and E. M. Yuniarno. Speed Monitoring for Multiple Vehicle Using Closed Circuit Television (CCTV) Camera. 2018.
Abhijit Kundu, Yin Li, and James M. Rehg. 3DRCNN: Instance-Level 3D Object Reconstruction via Render-and-Compare. In 2018 IEEE Conference on Computer Vision and Pattern Recognition, CVPR 2018, Salt Lake City, UT, USA, Jun. 18-22, 2018, pp. 3559-3568. IEEE Computer Society, 2018.

(Continued)

*Primary Examiner* — Allen C Wong

(57) ABSTRACT

A speed estimation system includes: a detection module configured to determine bounding boxes of an object moving on a surface in images, respectively, captured using a camera; a solver module configured to, based on the bounding boxes, determine a homography of the surface by solving an optimization problem, where the solver module is not trained; and a speed module configured to, using the homography, determine a speed that the object is moving on the surface.

22 Claims, 12 Drawing Sheets
(3 of 12 Drawing Sheet(s) Filed in Color)

(56) References Cited

OTHER PUBLICATIONS

Adrien Lessard, Francois Belisle, Guillaume-Alexandre Bilodeau, and Nicolas Saunier. The Counting App, or How to Count Vehicles in 500 Hours of Video. In 2016 IEEE Conference on Computer Vision and Pattern Recognition Workshops (CVPRW), pp. 1592-1600, Las Vegas, NV, USA, Jun. 2016. IEEE.

Alex Bewley, ZongYuan Ge, Lionel Ott, Fabio Tozeto Ramos, and Ben Upcroft. Simple online and realtime tracking. In ICIP, pp. 3464-3468. IEEE, 2016.

Alireza Makhzani, Jonathon Shlens, Navdeep Jaitly, Ian Goodfellow, and Brendan Frey. Adversarial autoencoders. arXiv preprint arXiv:1511.05644, 2015.

Amit Kumar, Pirazh Khorramshahi, Wei-An Lin, Prithviraj Dhar, Jun-Cheng Chen, and Rama Chellappa. A Semi-Automatic 2D Solution for Vehicle Speed Estimation from Monocular Videos. In CVPRW, pp. 137-1377, Salt Lake City, UT, USA, Jun. 2018. IEEE.

Arsalan Mousavian, Dragomir Anguelov, John Flynn, and Jana Kosecka. 3D Bounding Box Estimation Using Deep Learning and Geometry. In 2017 IEEE Conference on Computer Vision and Pattern Recognition, CVPR 2017, Honolulu, HI, USA, Jul. 21-26, 2017, pp. 5632-5640. IEEE Computer Society, 2017.

C. Maduro, K. Batista, P. Peixoto, and J. Batista. Estimation of vehicle velocity and traffic intensity using rectified images. In 2008 15th IEEE International Conference on Image Processing, pp. 777-780, Oct. 2008. ISSN: 2381-8549.

Chan Antoni B. and Vasconcelos Nuno, classification and retrieval of traffic video using autoregressive stochastic processes. 2005.

David Fernández Llorca, Antonio Hernández Martínez, and Iván García Daza. Vision-based Vehicle Speed Estimation for ITS: A Survey. arXiv:2101.06159 [cs], Jan. 2021. arXiv: 2101.06159.

Diederik P. Kingma and Jimmy Ba. Adam: A method for stochastic optimization. In Yoshua Bengio and Yann LeCun, editors, 3rd International Conference on Learning Representations, ICLR 2015, San Diego, CA, USA, May 7-9, 2015, Conference Track Proceedings, 2015.

Diogo Luvizon, Bogdan Tomoyuki Nassu, and Rodrigo Minetto. A Video-Based System for Vehicle Speed Measurement in Urban Roadways. IEEE Transactions on Intelligent Transportation Systems, pp. 1-12, Sep. 2016.

Fabian Manhardt, Wadim Kehl, and Adrien Gaidon. ROI-10D: Monocular Lifting of 2D Detection to 6D Pose and Metric Shape. In IEEE Conference on Computer Vision and Pattern Recognition, CVPR 2019, Long Beach, CA, USA, Jun. 16-20, 2019, pp. 2069-2078. Computer Vision Foundation / IEEE, 2019.

Frederick W. Cathey and Daniel J. Dailey. Mathematical theory of image straightening with applications to camera calibration. In IEEE Intelligent Transportation Systems Conference, ITSC 2006, Toronto, Ontario, Canada, Sep. 17-20, 2006, pp. 1364-1369. IEEE, 2006.

Ghazi Al-Naymat, Sanjay Chawla, and Javid Taheri. SparseDTW: A Novel Approach to Speed up Dynamic Time Warping. arXiv:1201.2969 [cs], Jan. 2012. arXiv: 1201.2969.

Heba A. Kurdi. Review of Closed Circuit Television (CCTV) Techniques for Vehicles Traffic Management. International Journal of Computer Science and Information Technology, 6:199-206, Apr. 2014.

Hou-Ning Hu, Qi-Zhi Cai, DequanWang, Ji Lin, Min Sun, Philipp Krahenbuhl, Trevor Darrell, and Fisher Yu. Joint Monocular 3D Vehicle Detection and Tracking. In ICCV, p. 10, 2019.

Huikun Bi, Zhong Fang, Tianlu Mao, Zhaoqi Wang, and Zhigang Deng. Joint Prediction for Kinematic Trajectories in Vehicle-Pedestrian-Mixed Scenes. In ICCV, p. 10, 2019.

Jacob Devlin, Ming-Wei Chang, Kenton Lee, and Kristina Toutanova. BERT: pre-training of deep bidirectional transformers for language understanding. In Jill Burstein, Christy Doran, and Thamar Solorio, editors, Proceedings of the 2019 Conference of the North American Chapter of the Association for Computational Linguistics: Human Language Technologies, NAACL-HLT 2019, Minneapolis, MN, USA, Jun. 2-7, 2019, vol. 1 (Long and Short Papers), pp. 4171-4186. Association for Computational Linguistics, 2019.

Jakub Sochor, et al., *Traffic Surveillance Camera Calibration by 3D Model Bounding Box Alignment for Accurate Vehicle Speed Measurement*, Computer Vision and Image Understanding, 161:87-98, Aug. 2017, arXiv:1702.06451.

Jakub Sochor, Jakub Španhel, and Adam Herout. BoxCars: Improving Fine-Grained Recognition of Vehicles using 3-D Bounding Boxes in Traffic Surveillance. IEEE Trans. Intell. Transport. Syst., 20(1):97-108, Jan. 2019. arXiv: 1703.00686.

Jakub Sochor, Jakub Spanhel, Roman Juranek, Petr Dobes, and Adam Herout. Graph@FIT Submission to the NVIDIA AI City Challenge 2018. In 2018 IEEE/CVF Conference on Computer Vision and Pattern Recognition Workshops (CVPRW), pp. 77-777, Salt Lake City, UT, USA, Jun. 2018. IEEE.

Jakub Sochor, Roman Juránek, and Adam Herout. Traffic Surveillance Camera Calibration by 3D Model Bounding Box Alignment for Accurate Vehicle Speed Measurement. Computer Vision and Image Understanding, 161:87-98, Aug. 2017. arXiv: 1702.06451.

Jakub Sochor, Roman Juránek, Jakub Spanhel, Lukás Marsík, Adam Siroký, Adam Herout, and Pavel Zemcík. Comprehensive Data Set for Automatic Single Camera Visual Speed Measurement. IEEE Transactions on Intelligent Transportation Systems, 20(5):1633-1643, May 2019.

Jakub Španhel, Jakub Sochor, Roman Juránek, Petr Dobeš, Vojtech Bartl, and Adam Herout. Learning Feature Aggregation in Temporal Domain for Re-Identification. arXiv:1903.05244 [cs], Mar. 2019. arXiv: 1903.05244.

James S Bergstra, Rémi Bardenet, Yoshua Bengio, and Balázs Kégl. Algorithms for Hyper-Parameter Optimization. In NeurIPS, p. 9, 2011. https://papers.nips.cc/paper/2011/file/86e8f7ab32cfd12577bc2619bc635690-Paper.pdf.

Jing Li, Shuo Chen, Fangbing Zhang, Erkang Li, Tao Yang, and Zhaoyang Lu. An Adaptive Framework for Multi-Vehicle Ground Speed Estimation in Airborne Videos. Remote Sensing, 11(10):1241, Jan. 2019.

Julian Nubert, Nicholas Giai Truong, Abel Lim, Herbert Ilhan Tanujaya, Leah Lim, and Mai Anh Vu. Traffic Density Estimation using a Convolutional Neural Network. Technical report, 2018.

Junaid Ahmed Ansari, Sarthak Sharma, Anshuman Majumdar, J. Krishna Murthy, and K. Madhava Krishna. The Earth Ain't Flat: Monocular Reconstruction of Vehicles on Steep and Graded Roads from a Moving Camera. In 2018 IEEE/RSJ International Conference on Intelligent Robots and Systems, IROS 2018, Madrid, Spain, Oct. 1-5, 2018, pp. 8404-8410. IEEE, 2018.

Kaiming He, Georgia Gkioxari, Piotr Dollár, and Ross Girshick. Mask R-CNN. arXiv:1703.06870 [cs], Jan. 2018. arXiv: 1703.06870.

Lazaros Grammatikopoulos, George Karras, and Elli Petsa. Automatic estimation of vehicle speed from uncalibrated video sequences. 2005.

Markéta Dubská and Adam Herout. Real Projective Plane Mapping for Detection of Orthogonal Vanishing Points. In Proceedings of the British Machine Vision Conference 2013, p. 90.1-90.11, Bristol, 2013. British Machine Vision Association.

Marketa Dubska, Adam Herout, and Jakub Sochor. Automatic Camera Calibration for Traffic Understanding. In Proceedings of the British Machine Vision Conference 2014, pp. 42.1-42.12, Nottingham, 2014. British Machine Vision Association.

Marketa Dubska, Adam Herout, Roman Juranek, and Jakub Sochor. Fully Automatic Roadside Camera Calibration for Traffic Surveillance. IEEE Transactions on Intelligent Transportation Systems, 16(3):1162-1171, Jun. 2015.

Panagiotis Giannakeris, Vagia Kaltsa, Konstantinos Avgerinakis, Alexia Briassouli, Stefanos Vrochidis, and Ioannis Kompatsiaris. Speed Estimation and Abnormality Detection from Surveillance Cameras. In 2018 IEEE/CVF Conference on Computer Vision and Pattern Recognition Workshops (CVPRW), pp. 93-936, Salt Lake City, UT, USA, Jun. 2018. IEEE.

Paul Wohlhart and Vincent Lepetit. Learning descriptors for object recognition and 3D pose estimation. In IEEE Conference on Com-

(56) References Cited

OTHER PUBLICATIONS puter Vision and Pattern Recognition, CVPR 2015, Boston, MA, USA, Jun. 7-12, 2015, pp. 3109-3118. IEEE Computer Society, 2015.
PyTorch: Source Code For Torchvision.Models.Detection>mask_RCNN ; Torch Contributors. accessed Jul. 7, 2021. <https://pytorch.org/vision/stable/_modules/torchvision/models/detection/mask_rcnn.html.>.
R.L. Graham, *An Efficient Algorithm for Determining the Convex Hull of a Finite Planar Set*, Information Processing Letters, 1(4):132-133, Jun. 1972.
Robert Tibshirani. Regression Shrinkage and Selection via the Lasso. Journal of the Royal Statistical Society. Series B (Methodological), 58(1):267-288, 1996. Publisher: [Royal Statistical Society, Wiley].
Roberto Cipolla, Tom Drummond, and Duncan Robertson. Camera Calibration from Vanishing Points in Image of Architectural Scenes. In BMVC, vol. 2, 1999.
Roman Juranek, Adam Herout, Marketa Dubska, and Pavel Zemcik. Real-Time Pose Estimation Piggybacked on Object Detection. In 2015 IEEE International Conference on Computer Vision (ICCV), pp. 2381-2389, Santiago, Dec. 2015. IEEE.
Romil Bhardwaj, Gopi Krishna Tummala, Ganesan Ramalingam, Ramachandran Ramjee, and Prasun Sinha. AutoCalib: Automatic Traffic Camera Calibration at Scale, p. 10, 2017.
Sabbani Imad, Perez-uribe Andres, Bouattane Omar, and El Moudni Abdellah. Deep convolutional neural network architecture for urban traffic flow estimation. IJCSNS, 2018.
Shaoqing Ren, Kaiming He, Ross Girshick, and Jian Sun. Faster R-CNN: Towards Real-Time Object Detection with Region Proposal Networks. IEEE Transactions on Pattern Analysis and Machine Intelligence, 39(6):1137-1149, Jun. 2017. Conference Name: IEEE Transactions on Pattern Analysis and Machine Intelligence.
Tingting Huang. Traffic Speed Estimation from Surveillance Video Data. 2018.
Todd Nelson Schoepflin and Daniel J Dailey. Algorithms for Estimating Mean Vehicle Speed Using Uncalibrated Traffic Management Cameras. Technical report, 2003.
V. Bartl and A. Herout. OptInOpt: Dual Optimization for Automatic Camera Calibration by Multi-Target Observations. In 2019 16th IEEE International Conference on Advanced Video and Signal Based Surveillance (AVSS), pp. 1-8, Sep. 2019. ISSN: 2643-6213.
Viktor Kocur. Perspective transformation for accurate detection of 3D bounding boxes of vehicles in traffic surveillance. In Proceedings of the 24th Computer Vision Winter Workshop, 2019.
Vojtech Bartl, Jakub Spanhel, Petr Dobes, Roman Juranek, and Adam Herout. Automatic camera calibration by landmarks on rigid objects. Machine Vision and Applications, 32(1):2, Oct. 2020.
Vojtech Bartl, Roman Juranek, Jakub spanhel, and Adam Herout. PlaneCalib: Automatic Camera Calibration by Multiple Observations of Rigid Objects on Plane. In 2020 Digital Image Computing: Techniques and Applications (DICTA), pp. 1-8, Melbourne, Australia, Nov. 2020. IEEE.
Will Schroeder, Ken Martin, and Bill Lorensen. The Visualization Toolkit. 3rd Edition. 2002.
Xiao-Chen He and N. H. C. Yung. A Novel Algorithm for Estimating Vehicle Speed from Two Consecutive Images. In 8th IEEE Workshop on Applications of Computer Vision (WACV 2007), Feb. 20-21, 2007, Austin, Texas, USA, p. 12. IEEE Computer Society, 2007.
Zheng Tang, Gaoang Wang, Tao Liu, Young-Gun Lee, Adwin Jahn, Xu Liu, Xiaodong He, and Jenq-Neng Hwang. Multiple-Kernel Based Vehicle Tracking Using 3D Deformable Model and Camera Self-Calibration. CoRR, abs/1708.06831, 2017. _ print: 1708.06831.
Zheng Tang, Milind Naphade, Stan Birchfield, Jonathan Tremblay, William Hodge, Ratnesh Kumar, Shuo Wang, and Xiaodong Yang. PAMTRI: Pose-Aware Multi-Task Learning for Vehicle Re-Identification Using Highly Randomized Synthetic Data. In ICCV, p. 10, 2019.
Zhongdao Wang, Luming Tang, Xihui Liu, Zhuliang Yao, Shuai Yi, Jing Shao, Junjie Yan, Shengjin Wang, Hongsheng Li, and Xiaogang Wang. Orientation Invariant Feature Embedding and Spatial Temporal Regularization for Vehicle Re-identification. In IEEE International Conference on Computer Vision, ICCV 2017, Venice, Italy, Oct. 22-29, 2017, pp. 379-387. IEEE Computer Society, 2017.

\* cited by examiner

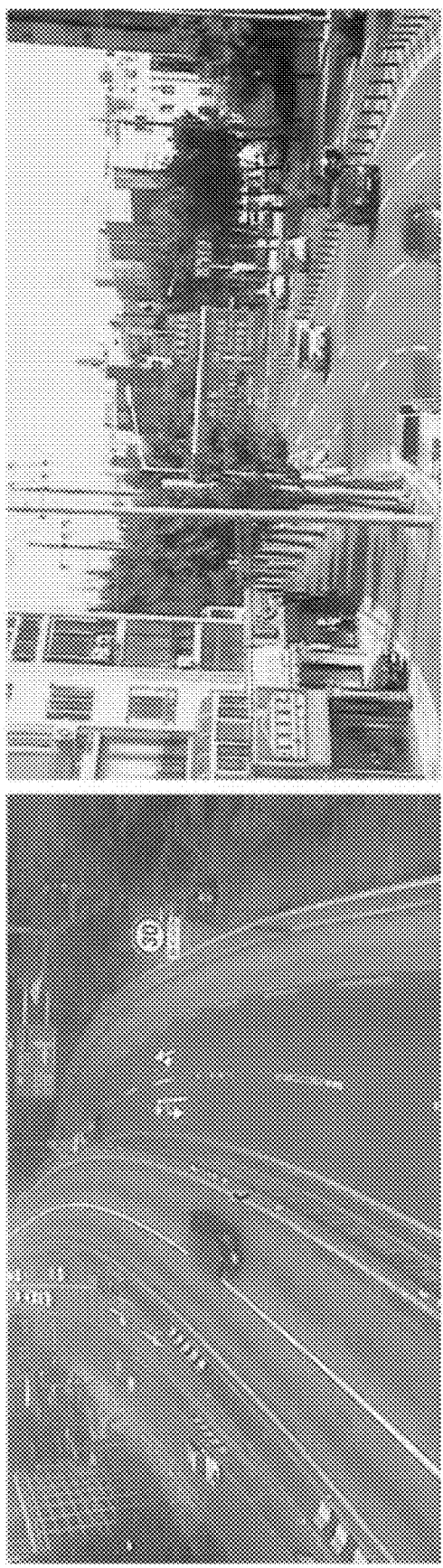
FIG. 3

UNTRAINED SYSTEMS AND METHODS FOR VEHICLE SPEED ESTIMATION

CROSS-REFERENCE TO RELATED APPLICATIONS

The present disclosure is related to U.S. patent application Ser. No. 17/162,353, filed 29 Jan. 2021, and the patent application titled Vehicle Speed Estimation Systems And Methods, U.S. patent application Ser. No. 17/365,389, filed on Jul. 1, 2021. The entire disclosures of the applications referenced above are incorporated herein by reference.

FIELD

The present disclosure relates to speed estimation systems and more particularly to systems and methods for estimating speed vehicles from video, such as from a closed circuit television (CCTV) camera.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Cameras, such as closed circuit television (CCTV) cameras may be used in various environments, such as for surveillance and traffic monitoring. Other hardware can also be used for traffic monitoring. For example, radar sensors can be installed near roadways and used to monitor traffic. As another example, inductive loops can be installed in roadways (e.g., near intersections) and used to monitor traffic. Such hardware, however, may be expensive and cannot be installed quickly and/or on a large scale. For example, inductive loops are typically installed within or below a road surface.

Systems that use cameras for traffic speed monitoring require accurate calibration. Such camera systems, however, may not be calibrated or may require constant recalibration if they are moving, so a homography of the road in these situations may be unknown. Geometry (e.g., 3D shape) of the roadway in view may also not be accounted for, potentially limiting the usefulness to roadways that are flat and straight. There continues therefore to be a need for systems and methods adapted to estimate the speed of objects that appear in videos without the need of camera calibration.

SUMMARY

In a feature, a speed estimation system includes: a detection module configured to determine bounding boxes of an object moving on a surface in images, respectively, captured using a camera; a solver module configured to, based on the bounding boxes, determine a homography of the surface by solving an optimization problem, where the solver module is not trained; and a speed module configured to, using the homography, determine a speed that the object is moving on the surface.

In further features, the solver module configured to determine the homography using an optimization algorithm.

In further features, the optimization algorithm is configured based on an assumption that the surface is planar.

In further features, the optimization algorithm is configured based on an assumption that pixels of the images are square.

In further features, the optimization algorithm is configured based on an assumption that images captured by the camera do not have horizontal skew and do not have vertical skew.

In further features, the optimization algorithm is configured based on an assumption that a principal point is at a center of the image.

In further features, the optimization algorithm is configured based on an assumption of zero roll of the camera.

In further features, the solver module includes a plurality of encoder modules configured to determine the homography.

In further features, the encoder modules have the Transformer architecture.

In further features, the solver module is configured to filter the homography before the homography is used to determine the speed that the object is moving on the surface.

In further features, the object is a vehicle.

In a feature, a speed estimation method includes: determining bounding boxes of an object moving on a surface in images, respectively, captured using a camera; without training, based on the bounding boxes, determining a homography of the surface by solving an optimization problem; and using the homography, determine a speed that the object is moving on the surface.

In further features, determining the homography includes determining the homography using an optimization algorithm.

In further features, the optimization algorithm is configured based on an assumption that the surface is planar.

In further features, the optimization algorithm is configured based on an assumption that pixels of the images are square.

In further features, the optimization algorithm is configured based on an assumption that images captured by the camera do not have horizontal skew and do not have vertical skew.

In further features, the optimization algorithm is configured based on an assumption that a principal point is at a center of the image.

In further features, the optimization algorithm is configured based on an assumption of zero roll of the camera.

In further features, determining the homography includes determining the homography using a plurality of encoder modules configured to determine the homography.

In further features, the encoder modules have the Transformer architecture.

In further features, the speed estimation method further includes filtering the homography before the homography is used to determine the speed that the object is moving on the surface.

In a feature, a speed estimation system includes: a means (e.g., one or more processors and memory including code) for determining bounding boxes of an object moving on a surface in images, respectively, captured using a camera; an untrained means (e.g., one or more processors and memory including code) for, based on the bounding boxes, determining a homography of the surface by solving an optimization problem; and a means (e.g., one or more processors and memory including code) for, using the homography, determining a speed that the object is moving on the surface.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein:

FIG. 3 includes example images of portions of roads captured using cameras with vehicles moving on the roads;

In the drawings, reference numbers may be reused to identify similar and/or identical elements.

DETAILED DESCRIPTION

Described herein is a data-driven approach to determine speeds of objects (e.g., vehicles) using video from cameras (e.g., closed circuit television cameras) that are uncalibrated (i.e., without known global camera parameters). Images used are not subject to any image processing prior to being used for speed determination. Camera calibration and scene (road) geometry is determined based on object bounding boxes.

The present application involves a solver module that determines mappings between pixel coordinates and distance coordinates (homographies) without global parameters describing a local geometry. The solver module is not trained in advance. The solver module can be used to generate a homography, which includes camera parameters, and which provides a linear transformation between two planes (i.e., a global mapping, e.g., between the pixel coordinate system and the (real-world) distance coordinate system) corresponding to a predetermined period of time, and the homography can be used to estimate an object's speed at any point over the predetermined period of time.

Figure 1:
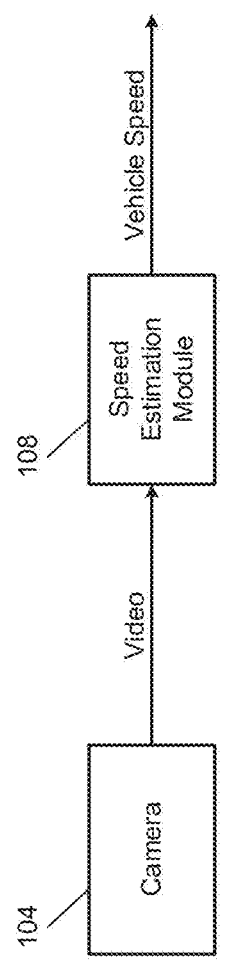
FIG. 1 is a functional block diagram of an example vehicle speed estimation system.

FIG. 1 is a functional block diagram of an example vehicle speed estimation system. While the example of vehicle speed estimation will be described, the present application is also applicable to estimating speeds of other types of objects (e.g., pedestrians, cyclists, runners, tractors, mountain bikers, boats, swimmers, skiers, snowmobilers, etc.) on surfaces (e.g., the ground and/or other types of paths, water, snow, etc.).

In the embodiment shown, a camera 104 captures video of a portion road over which vehicles travel. The road can be planar (no inclines and/or declines) and straight, the road can be planar and include one or more curves, the road can be non-planar (include one or more inclines and/or declines) and straight, or the road can be both non-planar and include one or more curves. The camera 104 captures images at a predetermined rate, such as 60 hertz (Hz), 120 Hz, etc. A time series of the images is used to form the video.

A speed estimation module 108 estimates the speed of a vehicle on the road using the images from the camera 104 as discussed further below. In various implementations, the speed estimation module 108 may estimate the speed of each vehicle on the road using the images from the camera 104. While the example of the video being captured using the camera 104 is provided, the present application is also applicable to estimating speed of a vehicle using video obtained via a network, such as the Internet, such as from one or more video sources (e.g., YouTube, video games, department of transportation, etc.) and/or databases. The present application is also applicable to video not generated by one or more cameras, such as animated video generated to include virtual vehicles on virtual surfaces (e.g., paths or ground).

The speed estimation module 108 may estimate the speed of each vehicle on the road using the images from the camera 104. The speed estimation module 108 may determine an average vehicle speed by averaging the speeds of all of the vehicles, respectively, on the road.

Figure 2:
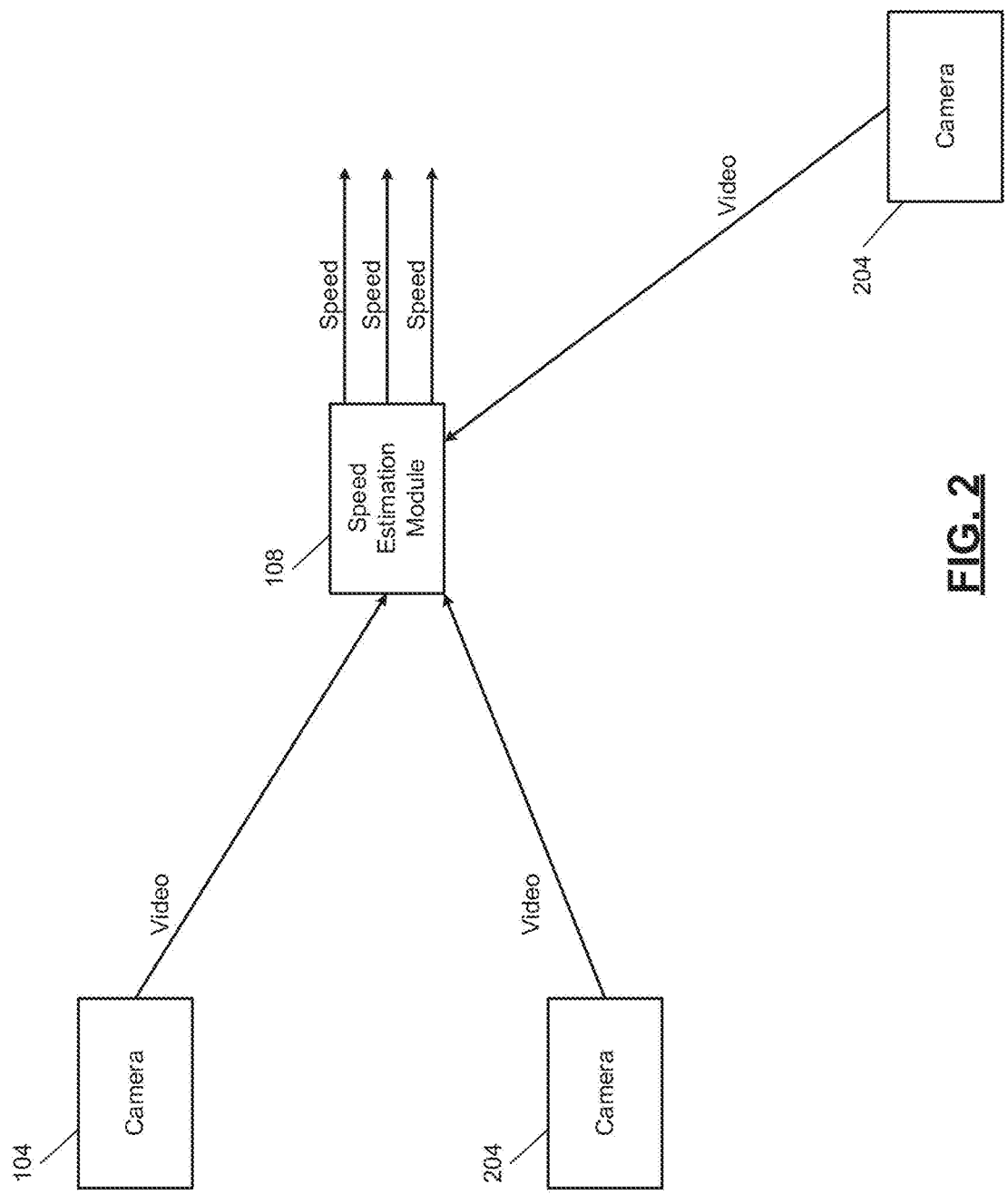
FIG. 2 is a functional block diagram of an example vehicle speed estimation system.

FIG. 2 is a functional block diagram of an example vehicle speed estimation system. As shown, the speed estimation module 108 may receive video from one or more additional cameras, such as cameras 204. The cameras 204 may capture video of different portions of different roads than the camera 104 and/or different parts of the same road as the camera 104. The speed estimation module 108 may estimate speeds of vehicles captured by each of the cameras 104 and 204.

The cameras may have a fixed field of view, or the cameras may be configured to tilt the field of view selectively upwardly and downwardly and/or pan the field of view selectively right and left. In various implementations, the cameras may be cameras of (mounted to) vehicles that move with the vehicles. FIG. 3 includes example images of portions of roads captured using cameras with vehicles moving on the roads. The locations of the cameras may be transmitted by the cameras or determined, for example, based a unique identifier of the camera transmitted with its video.

Figure 4:
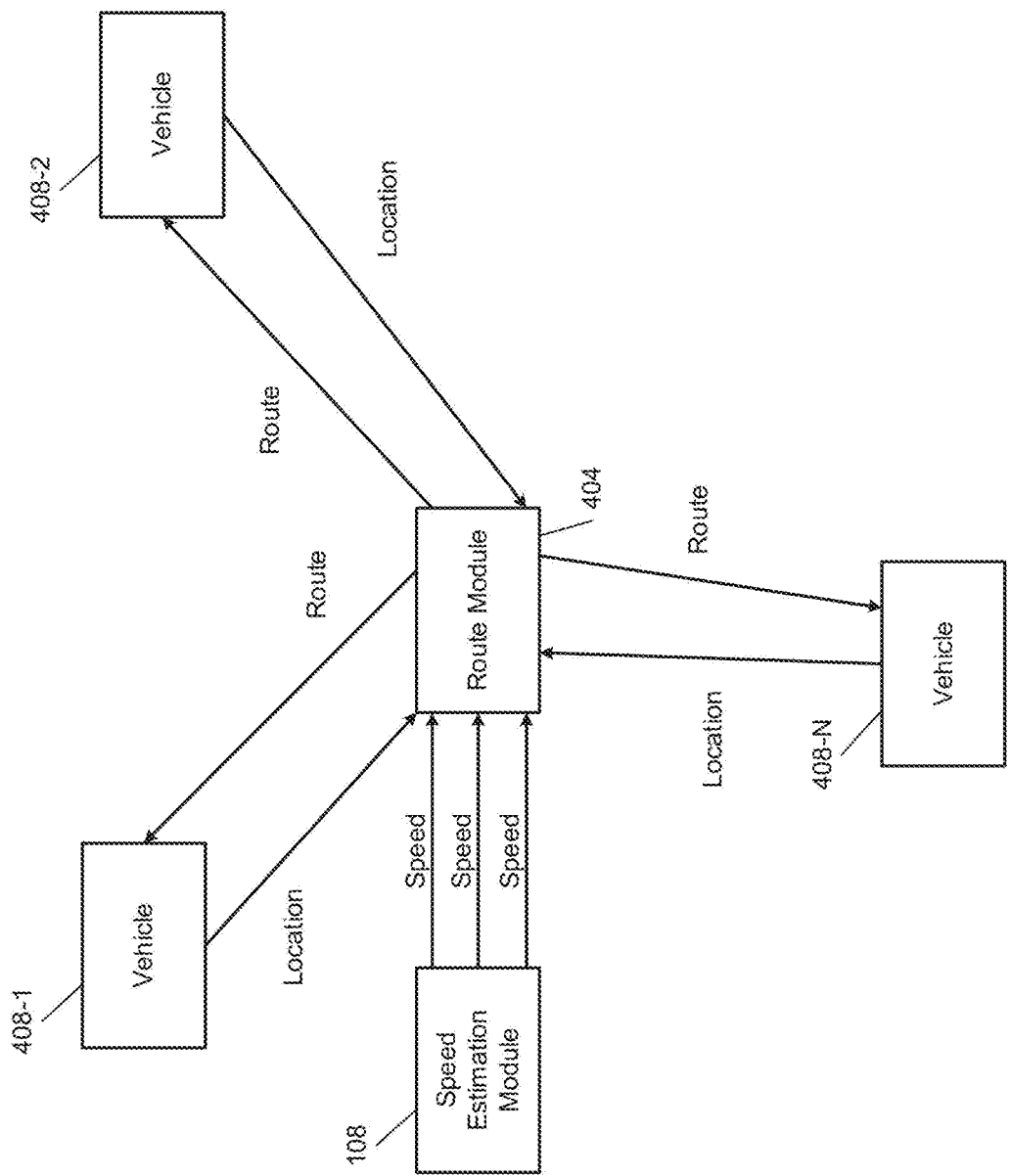
FIG. 4 includes an example implementation of a routing system for routing vehicle traffic.

Vehicle speeds estimated by the speed estimation module 108 may be used for one or more purposes. For example, FIG. 4 includes an example implementation of a routing system for routing vehicle traffic. The speed estimation module 108 may transmit the speeds of vehicles at various locations to a route module 404.

The route module 404 may determine a route for a vehicle to move from a starting location to a destination location based on the starting location, the destination location, and the vehicle speeds at one or more locations between starting and destination locations. For example, the route module 404 may determine the fastest possible route from the starting location to the destination location based on one or more of the vehicle speeds at various different locations and set the route for the vehicle to the fastest possible route.

Example vehicles 408-1, 408-2, 408-N ("vehicles 408") are shown, where N is an integer greater than or equal to 1. In various implementations, the vehicles 408 may be a fleet of autonomous vehicles, semi-autonomous vehicles, or non-autonomous (driver driven) vehicles. The vehicles 408 may navigate or provide directions (e.g., audibly and/or visually) for navigating to their respective destination locations according to the respective routes set by the route module 404.

The route module 404 may also selectively update the route of a vehicle while the vehicle is traveling to its destination location. Each of the vehicles 408 may wirelessly transmit its location to the route module 404. When the vehicle speeds at one or more locations along the present route decrease or fall below a predetermined speed, the route module 404 may update the route to avoid those one or more locations and to follow a route that will allow the vehicle to get to the destination location most quickly. While the example of vehicles 408 has been provided, the present application is also applicable to mobile devices, such as smart phones, tablets, etc. Also, while examples of routing have been provided, the routing module 404 may determine or adjust the route of a vehicle based on one or more of the vehicle speeds for one or more other reasons.

Figure 5:
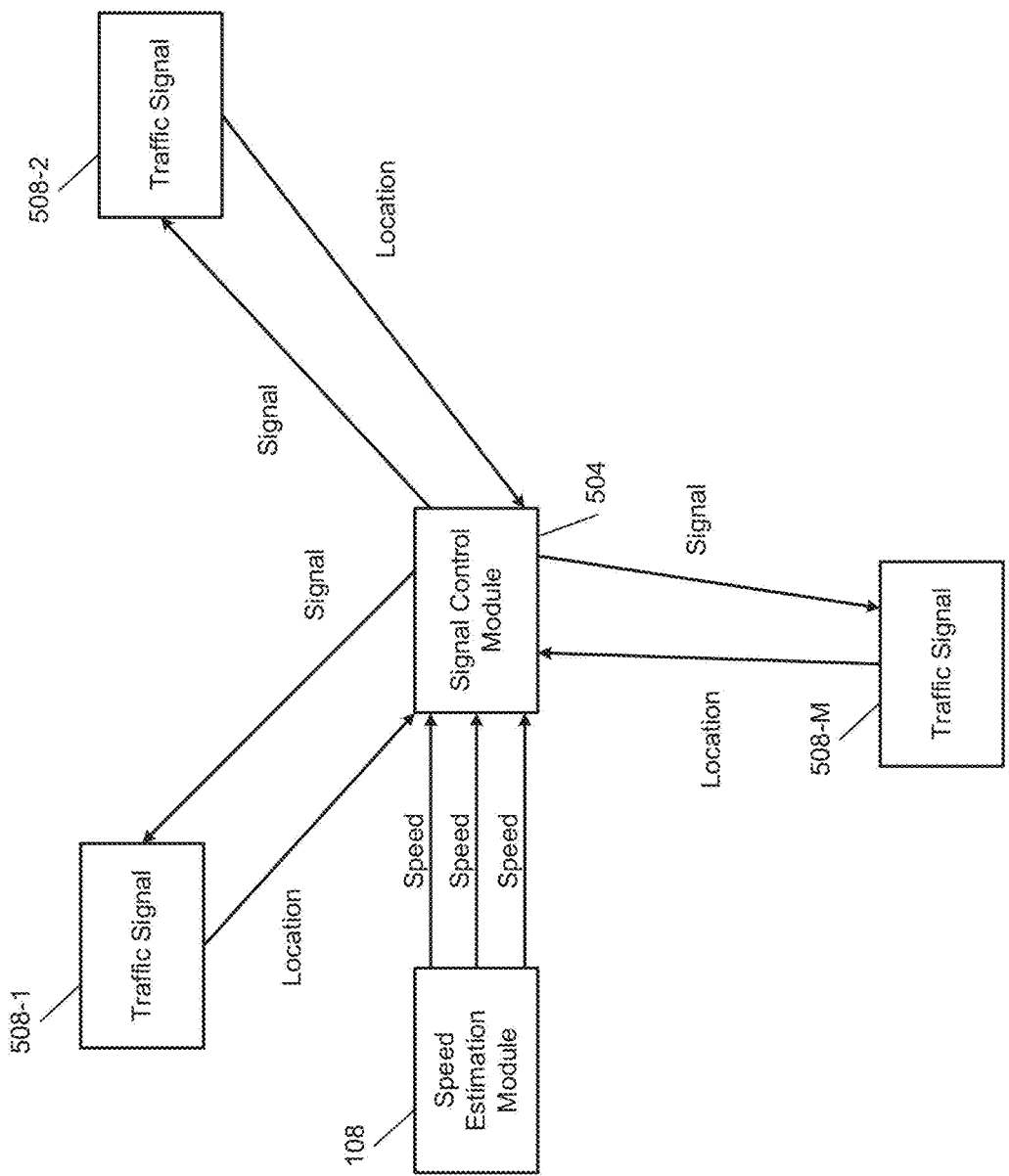
FIG. 5 includes an example implementation of a signaling system for traffic signaling.

FIG. 5 includes an example implementation of a signaling system for traffic signaling. The speed estimation module 108 may transmit the speeds of vehicles at various locations to a signal control module 504. The signal control module 504 may control timing of traffic signals 508-1, 508-2, 508-M, where M is an integer greater than or equal to 1, based on one or more of the vehicle speeds at or near their respective locations. For example, the signal control module 504 may control the traffic signal at an intersection to increase a period that vehicles are permitted to drive through the intersection in a direction when vehicle speeds in the direction at or near the intersection are less than a predetermined speed or have been less than the predetermined speed for a predetermined period. The signal control module 504 may also control the traffic signal to decrease a period that vehicles are permitted to drive through the intersection in another direction. While examples of controlling signaling have been provided, the signal control module 504 may determine or adjust the timing of one or more traffic signals based on one or more of the vehicle speeds for one or more other reasons.

While example uses of vehicle speed estimated by the speed estimation module 108 have been provided, the present application is also applicable to other uses of one or more of the vehicle speeds.

Figure 6:
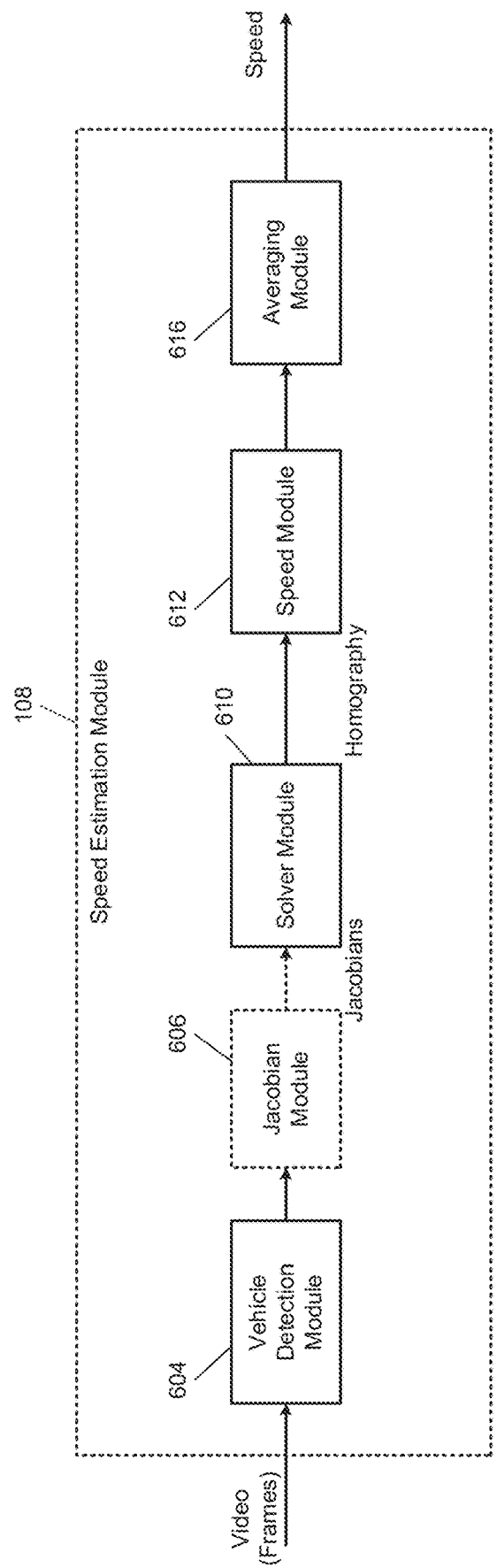
FIG. 6 is a functional block diagram of an example implementation of a speed estimation module.

FIG. 6 is a functional block diagram of an example implementation of the speed estimation module 108. A vehicle detection module 604 (or more generally an object detection module) detects and determines bounding boxes of one or more vehicles in each frame of the video, which in one embodiment is received from a camera 104. The vehicle detection module 604 may detect vehicles, for example, using the Mask-RCNN (mask rich convolutional neural network) or another suitable vehicle detection algorithm. The vehicle detection module 604 tracks each vehicle from frame to frame to create tracks for the vehicles, respectively. The track for a vehicle includes a time series of bounding boxes (or coordinates of the bounding boxes) for that vehicle. The vehicle detection module 604 may track the vehicles, for example, using the simple online and realtime (SORT) algorithm or another suitable tracking algorithm.

In various implementations, a Jacobian module 606 may determine Jacobians of the bounding boxes, respectively. The Jacobian module 606 may determine the Jacobians, for example, using regression. In various implementations, the Jacobian module 606 may be omitted, and the bounding boxes may be input to a solver module 610.

The solver module 610 determines a homography based on the Jacobians (or the bounding boxes) by solving an optimization problem. The solver module 610 is not trained using a stored training dataset, such as including synthetic or real video of vehicles moving on roadways. Instead, the solver module 610 is untrained.

The solver module 610 generates the homography using input from the camera by solving an optimization problem. As an example of the solver module 610, the solver module 610 may execute a Gaussian geometric optimization algorithm (see for example methods disclosed in "Algorithms for Hyper-Parameter Optimization", by James Bergstra et al., published in "Advances in Neural Information Processing Systems", NIPS 2011, which is incorporated herein by reference). While this example is provided, the present application is also applicable to other optimization algorithms.

In various implementations, the optimization problem may be expressed as $$h^* = \mathrm{argmin}_{h \in M} E(h, D),$$

where $$E(h,D) = \sum_{j=1}^{|D|} \ell \sum_{i=1}^{|z_j|} (B_{j,i}, f_h(B_{j,i})),$$

and D is a set of detections (e.g., bounding boxes), h is the homography, E is an energy function, and B is a bounding box.

A speed module 612 determines the speed of a vehicle using the homography. The speed module 612 may determine an average vehicle speed by averaging the speeds of multiple or all vehicles at a given time. Averaging may include adding the speeds of each vehicle and dividing the sum by the total number of speeds added.

To summarize, the speed estimation module 108 involves a three-stage pipeline of detecting and tracking each vehicle and then estimating its speed. More specifically, the speed estimation module 108 performs (1) vehicle detection, (2) vehicle tracking, and (3) homography determination to determine vehicle speed.

No dedicated vehicle speed sensors are used in the vehicle speed estimation.

In an embodiment, vehicle detection is accomplished by the vehicle detection module 604 using an object detector (object detection algorithm) based on a deep network, such as the Faster-regions with convolutional neural network (Faster-RCNN) object detection algorithm, to determine pixel coordinates for a vehicle. Additional information regarding Faster-RCNN can be found in "*Faster R-CNN: Towards Real-Time Object Detection with Regional proposal Networks*", by Shaoqing Ren, et al., IEEE Transactions on Pattern Analysis and Machine Intelligence, 39(6): 1137-1149, June 2017, which is incorporated herein in its entirety.

The tracking may involve connecting the temporal vehicle detections (e.g., 2D bounding boxes) over time to form vehicle tracks. The tracker can either be heuristic (e.g., including a Kalman filter) or trained.

The vehicle speed estimation includes converting each track (e.g., the pixel coordinates of a vehicle over time or the bounding boxes) to displacements (e.g., meters) in a coordinate system (homography) aligned onto the road. This may involve using the homography that maps image pixels with the road surface. Once the homography has been determined, vehicle tracks can be projected into real world coordinates, and the real world coordinates can be used for vehicle speed estimation.

The speed estimation module 108 determines the vehicle speeds using a transform that relates the camera view with the road plane (namely the homography) in the field of view of the camera. This is similar to but different than calibrating the camera. Accuracy of the homography and the camera parameters provides accurate vehicle speed estimates.

Camera parameters include intrinsic parameters that describe the camera optics (e.g., the principal point, the focal length and distortion coefficients) and extrinsic parameters that describe the position of the camera in the 3D world (e.g., translation and rotation). The concepts discussed herein which are different than camera calibration where calibration parameters are either manually entered by a user or estimated from a frame. The manual entry may include a user annotating multiple points on a road with dimensions. The estimation may assume a straight road and rely on detecting vanishing points as an intersection of road markings (e.g., line markings) or on vehicle motion. Once the camera parameters are known, and assuming a planar road, they directly yield the road homography up to an unknown scaling factor. This factor also needs to be estimated accurately, as all estimated speeds will be proportional to it.

Manual annotations may be used to calibrate camera parameters where several distances are accurately measured on the road plane. A fully automatic approach to calibrate camera parameters may include estimating the scene scale by recognizing vehicles along with their 3D pose, retrieving their 3D model, and aligning the 3D model with its bounding box on the CCTV frame. These camera parameter calibration approaches, however, may make assumptions, such as: (1) the camera is fixed; (2) the road is planar; and (3) the road is straight. The systems and methods described herein provide accuracy even for use of pan tilt zoom (PTZ) cameras.

The speed module 612 performs pixel coordinates to real world (3D) position using the homography and determines speed based on changes in the real world position over time (e.g., distance moved divided by the period between position measurements). As discussed above, the present application involves estimating average speed of vehicles captured using a camera, such as monocular camera. First, the speed module 612 determines an instantaneous speed for each vehicle at each time (frame of video) based on the position of the vehicle in that frame, a previous position of the vehicle in a previous frame, and a period between the two frames. Second, an averaging module 616 may average the instantaneous speeds for all of the vehicles at a given time to determine the average speed at that time.

Figure 7:
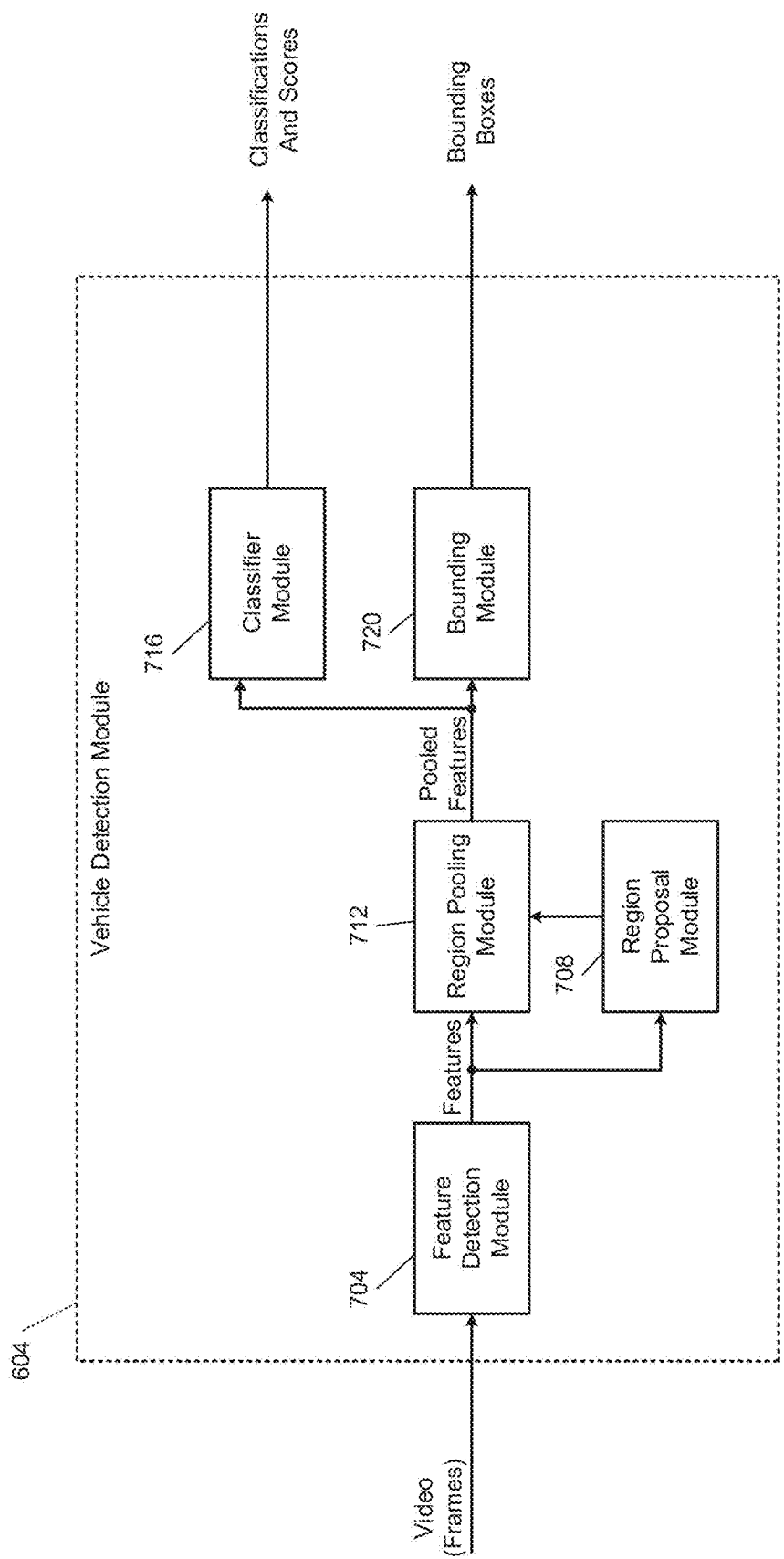
FIG. 7 includes a functional block diagram of an example vehicle detection system that may be utilized by the example speed estimation system shown in FIG. 6.

FIG. 7 includes a functional block diagram of an example vehicle detection module 604 that may be utilized by the speed estimation module 108 shown in FIG. 6. A feature detection module 704 receives a video produced, for example, by a camera. The feature detection module 704 identifies features in a frame/image of the video at a time using a feature detection algorithm.

A region proposal module 708 proposes regions of interest in the frame based on the features using a region proposal algorithm. A region pooling module 712 pools features based on the proposed regions to produce pooled features.

A classifier module 716 classifies objects formed by the pooled features using an object classification algorithm. One possible classification of objects includes vehicles. The classifier module 716 may also determine scores for each classified object, where the score of an object indicates a relative confidence of the classification determined for the object. Objects having one or more predetermined classifications (e.g., vehicles) and confidence levels greater than a predetermined value may be subject to speed estimation.

A bounding module 720 determines 2D bounding boxes that bound outer edges of the objects identified. The bounding module 720 may also determine coordinates (p) of the objects, such as coordinates of centers of the bounding boxes. The bounding module 720 may determine a Jacobian for each bounding box, as referenced above.

In various implementations, the vehicle detection module 604 may include a Faster-RCNN that is applied to each video frame to obtain a set of vehicle detections and associated bounding boxes. The Faster-RCNN is a deep neural network that includes a ResNet-50 backbone (in the feature detection module 704) followed by one or more region proposal layers (in the region pooling module 712 and region proposal module 708, for example). For pooled features of each video frame output by the region pooling module 712, a region proposal (i.e., a 2D bounding box in the image) is output by the bounding module 720 and a classification (e.g., car, truck, bus, motorcycle) and a confidence score is output by the classifier module 716. Region proposals with low confidence scores are discarded by the vehicle detection module 604. Objects not having a predetermined classification (e.g., vehicles) may also be discarded.

As discussed above, the solver module 610 is untrained. The solver module 610 instead generates a homography based on an unordered set of detections (e.g., bounding boxes). In various implementations, the solver module 610 may have the Transformer architecture. The Transformer architecture as used herein is described in Ashish Vaswani, Noam Shazeer, Niki Parmar, Jakob Uszkoreit, Llion Jones, Aidan N Gomez, Ł ukasz Kaiser, and Illia Polosukhin, "Attention is all you need", In I. Guyon, U. V. Luxburg, S. Bengio, H. Wallach, R. Fergus, S. Vishwanathan, and R. Garnett, editors, Advances in Neural Information Processing Systems 30, pages 5998-6008, Curran Associates, Inc., 2017, which is incorporated herein in its entirety. While one example Transformer architecture is provided, the present application is also applicable to other Transformer architectures.

The solver module 610 generates a homography H given a set of vehicle detections D. The solver module 610 generates the homography based on the assumption that the road portion visible in the field of view of an image acquired using a camera is planar. As such, calibrating the homography amounts to recovering the homography $$\mathcal{H}: \mathbb{R}^2 \to \mathbb{R}^2$$

that maps a position $x \in \mathbb{R}^2$ in (e.g., metric) road coordinate system to a pixel position $\mathcal{H}(x)$:

$$\mathcal{H}(x) = \left( \frac{\mathcal{H}_1 \bar{x}}{\mathcal{H}_3 \bar{x}}, \frac{\mathcal{H}_2 \bar{x}}{\mathcal{H}_3 \bar{x}} \right),$$

where $\mathcal{H} \in \mathbb{R}^{3\times 3}$ is the homography matrix ($\mathcal{H}$ i denotes the i-th row) and $\bar{x}=(x0, x1, 1)$.

The homography includes all extrinsic and intrinsic camera parameters and can be uniquely decomposed into a rigid motion (rotation R and translation T) forming $$[R|T] \in SE \quad (3)$$

followed by a projection onto the image plane using the intrinsic calibration matrix $K \in \mathbb{R}^{3\times 3}$, $$\mathcal{H} \in K[R|T]D \quad (1)$$

where $D=\text{diag}([1,1,0,1])$ projects onto the xy plane.

Homographies can include 8 degrees of freedom (DOF). The homography described herein, however, can have only 3 free parameters based on the assumption of square pixels, no skew (i.e., no vertical or horizontal skew of the images), a principal point is at the image center, no camera roll, and the realization that vehicle speed (i.e., length measures) are invariant to translations and rotations in the 2D road plane. This is in addition to the assumption above that the road portion visible in the field of view of the camera is planar.

The solver module 610 generates the homography by selecting a focal f, a camera tilt angle γ and a camera height z (e.g., in meters) in equation (1) as follows:

$$\mathcal{H} = \mathcal{T}\left(\frac{I_w}{2}, \frac{I_H}{2}\right) F \left[R^x(\gamma) \begin{vmatrix} 0 \\ 0 \\ -z \end{vmatrix}\right] D \quad (2)$$

where $\mathcal{T}: \mathbb{R}^2 \to \mathbb{R}^{3\times 3}$ is a 2D translation, $F=\text{diag}([f, f, 1])$, $R^x: \mathbb{R} \to \mathbb{R}^{3\times 3}$ is a 3D rotation around the x-axis, and $I_w$ and $I_H$ are the image width (w) and height (h), respectively.

The Jacobian of H at position x can be denoted as $\mathcal{J}_H(x) \in \mathbb{R}^{2\times 2}$. The apparent motion of a vehicle b in the image can be expressed as $$m_b = \frac{\partial u_b}{\partial t} \in \mathbb{R}^2,$$

where $u_b=H(\mathcal{T}_b)$ denotes the 2D projection of the vehicle center $\mathcal{T}_b \in \mathbb{R}^2$ in the road coordinate system. The Jacobian of $\mathcal{H}^{-1}$ denoted as $\mathcal{J}_{H^{-1}=\mathcal{J}_H^{-1}}$ yields the motion $q_b \in \mathbb{R}^2$ in the real world road plane:

$$q_b = \mathcal{J}_H^{-1}(\mu_b) m_b \quad (3)$$

The solver module 610 includes a deep neural network (DNN) $f_\theta$ that takes as input a set of detections $D=\{b, \ldots\}$ and outputs a corresponding set of Jacobians:

$$\hat{\mathcal{J}} = \{(\widehat{u_b}, \hat{\mathcal{J}}_b), \ldots\}$$

where $\widehat{u_b} \approx H(T_b)$ predicts the 2D position of the actual 3D vehicle bottom-center $T_b$ and $\hat{\mathcal{J}}_b \approx \mathcal{J}_H(\widehat{u_b})$ predicts the Jacobian of H at this vehicle bottom center.

The output of the solver module 610, the set of Jacobians $\hat{\mathcal{J}}$, includes sufficient information for the speed module 612 to determine the vehicle speed $v_b$. The speed may be defined as the norm of the vehicle's 3D motion as:

$$v_b = \|q_b\| = \left\|\frac{\partial T_b}{\partial t}\right\|$$

and according to equation (3), $$\widehat{q_b} \approx (\hat{\mathcal{J}}_b)^{-1} \frac{\partial u_b}{\partial t} \quad (4)$$

If not filtered, the (regressions) output by the solver module 610 would be noisy. The solver module 610 (or a separate filter module) may filter the output before use by the speed module 612. For example, the solver module 610 may filter the output to produce a homography $\hat{H}$ that achieves a good consensus among the set of all output Jacobians $\hat{\mathcal{J}}$. The solver module 610 may configure the filter, for example, using a RANSAC (ransom sample consensus) operation. For example, the solver module 610 may randomly sample 2 predictions ($\hat{u}_i, \hat{\mathcal{J}}_i$) and ($\hat{u}_j, \hat{\mathcal{J}}_j$), I not equal to j, and recover a homography $\hat{H}_{i,j}$ that is consistent with both Jacobians.

The solver module 610 may then compute a consensus score of $\hat{H}_{i,j}$ based on all of the Jacobians in $\hat{H}_{i,j}$. The solver module 610 may then select the homography that maximizes the consensus using:

$$\hat{H}=\text{argmax}_{i,j} \Sigma_{n=1}^{|\mathcal{J}|} \text{score}(\hat{H}_{i,j}, \hat{\mu}_n, \hat{\mathcal{J}}_n) \quad (5)$$

The score is defined as the similarity between $\hat{\mathcal{J}}_n$ and the corresponding Jacobian according to $\hat{H}_{i,j}$:

$$\text{score}(\hat{H}_{i,j}, \hat{\mu}_n, \hat{\mathcal{J}}_n) = \text{sim}(\mathcal{J}_{\hat{H},1}(\hat{\mu}), \hat{\mathcal{J}}_1) \text{sim}(\mathcal{J}_{\hat{H},2}(\hat{\mu}), \hat{\mathcal{J}}_2),$$

where sim is similarity. The similarity is determined for both column vectors of $\hat{\mathcal{J}} = [\hat{\mathcal{J}}_1, \hat{\mathcal{J}}_2]$ using a criteria that penalizes the orientation difference (first factor) and the norm difference (second factor) by:

$$\text{sim}(V, V') = \frac{V^T V'}{\|V\|\|V'\|} \cdot \frac{\min(\|V\|, \|V'\|)}{\max(\|V\|, \|V'\|)}$$

As discussed above, the solver module 610 may include the Transformer architecture, such as the bidirectional encoder representations from transformers (BERT) architecture. The solver module 610 may include a stack of multiple encoder blocks/modules such as 8 encoder modules or another suitable number of encoder modules. The solver module 610 takes as input a set of vectors and determines a representation:

$$r_b \in \mathbb{R}^B$$

for each detection b. Given a vehicle detection in the form of a pixel mask, $b \in \{0,1\}^{I_w \times I_H}$ with non-zero pixels $P_b=\{(i, j)|b_{i,j}=1\}$, the first and second order moments of $P_b$ can be concatenated (e.g., to produce an ellipse) together with the apparent motion $m_b$, where each term is normalized for generalization purposes. An 8 DOF representation can be written as:

$$r_b = \left[\text{mean}\left(\frac{P_b}{Iw}\right), \text{cov}\left(\frac{P_b}{Iw}\right), \frac{m_b}{\|m_b\|}\right] \in \mathbb{R}^8.$$

While this example is provided, the present example is also applicable to other representations.

Figure 8:
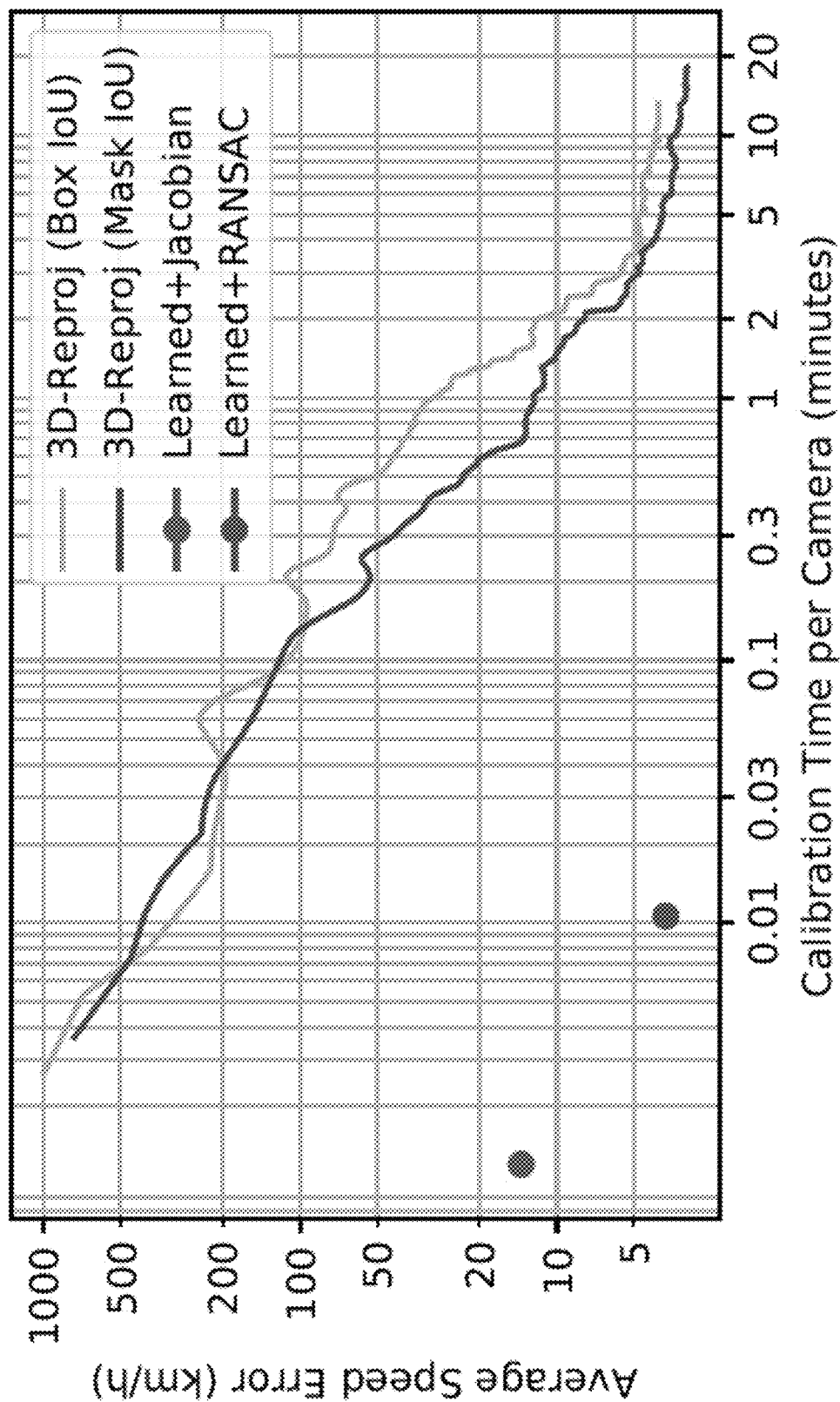
FIG. 8 is an example graph of average speed error versus training time for the learning based (untrained) systems described herein and different trained systems.
Figure 9:
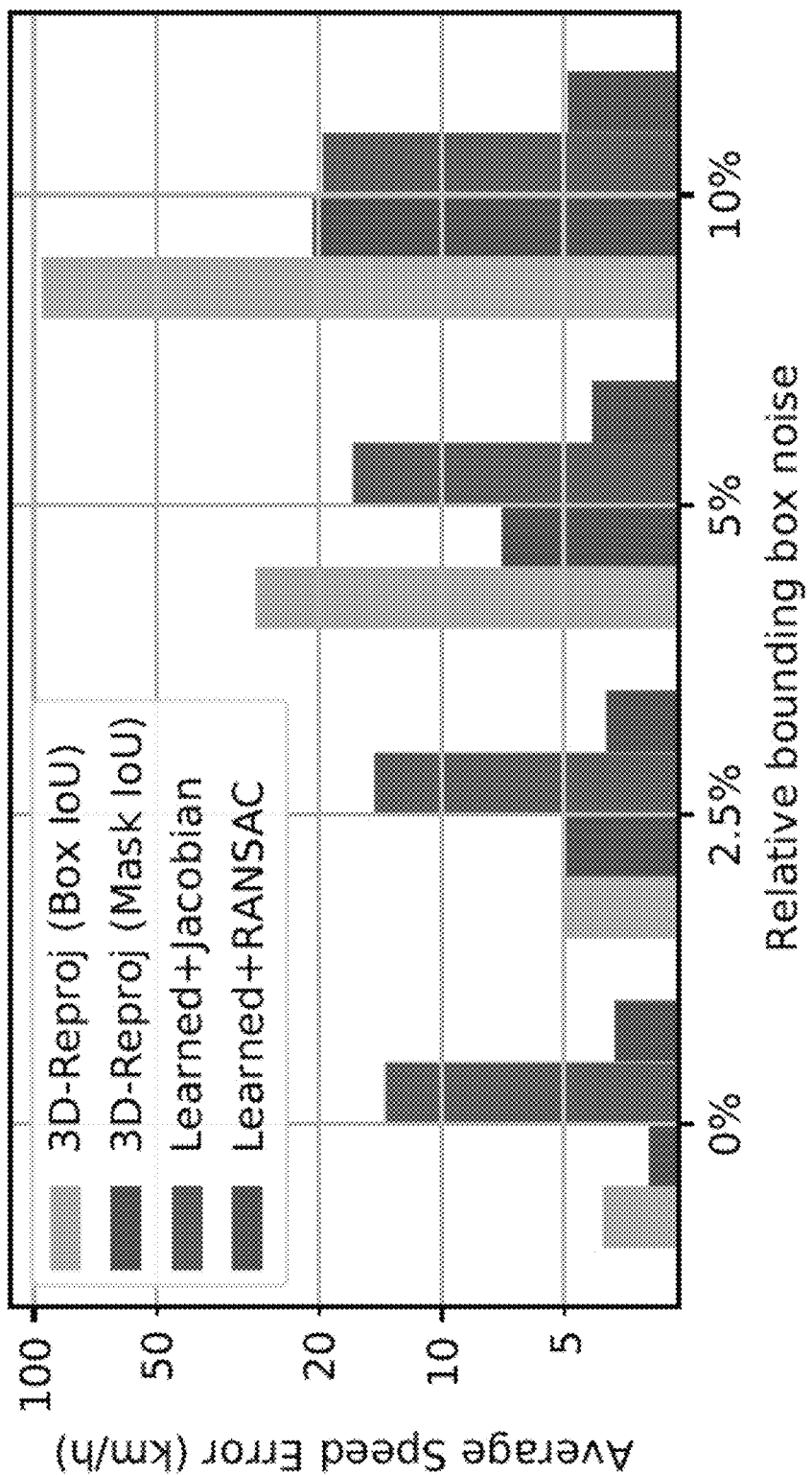
FIG. 9 is an example graph of average speed error versus noise introduced for the learning based (untrained) systems described herein and different trained systems.

FIG. 8 is an example graph of average speed error versus training time for the untrained systems described herein and different trained systems. As illustrated in FIG. 8 by the dots, the systems described herein can achieve a lower average speed error much more quickly and with significantly fewer samples than the trained systems tracked by the solid lines. The filtering described above improves accuracy. FIG. 9 is an example graph of average speed error versus noise introduced for the untrained systems described herein and other trained systems.

Figure 10:
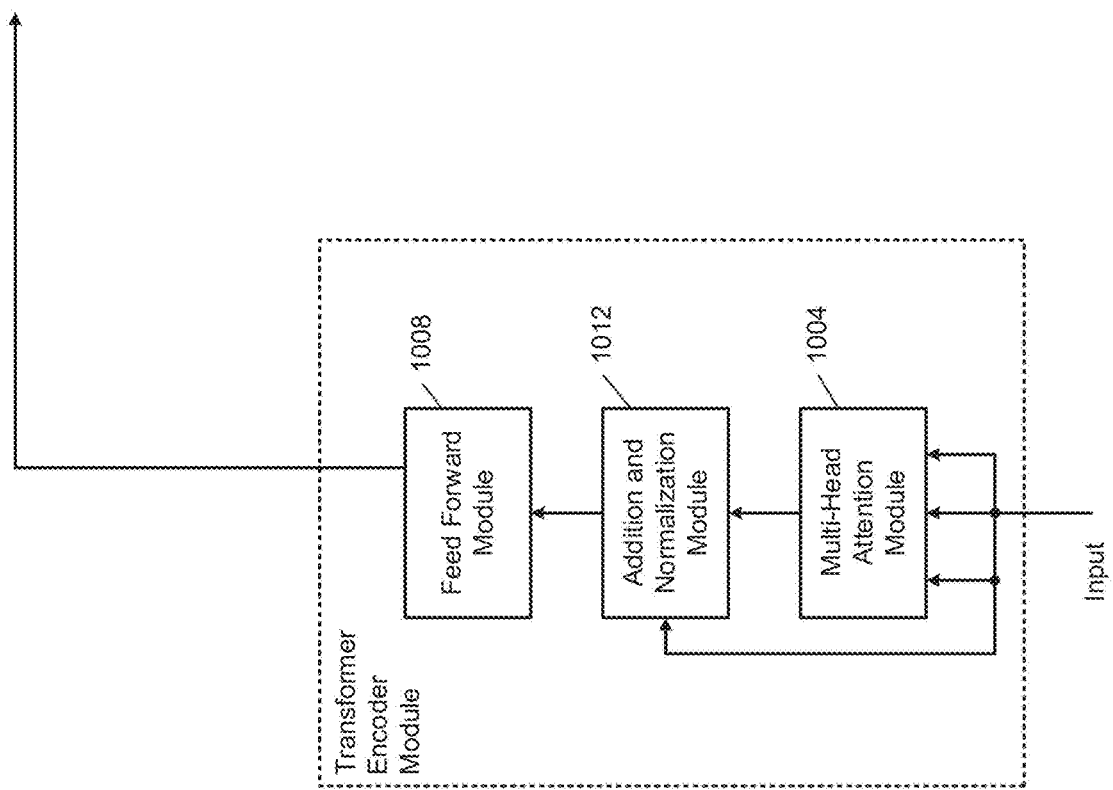
FIG. 10 is a functional block diagram of an example implementation of a transformer encoder module of a solver module.

FIG. 10 is a functional block diagram of an example implementation of a transformer encoder module of the solver module 610. As discussed above, the solver module 610 may include a stack of transformer encoder modules, such as connected end to end. The input to the transformer encoder module may be, for example, the pixel coordinates of a vehicle in an image or another suitable input.

The transformer encoder module may have two sub-layers. The first sub-layer may be a multi-head self-attention mechanism (module) 1004, and the second may be a position wise fully connected feed-forward network (module) 1008. Addition and normalization may be performed on the output of the multi-head attention module 504 and the concatenation by an additional and normalization module 1012. Residual connections may be used around each of the two sub-layers, followed by layer normalization. That is, the output of each sub-layer is LayerNorm (x+Sublayer(x)), where Sublayer(x) is the function implemented by the sub-layer itself.

To facilitate these residual connections, all sub-layers, as well as the embedding layers, may produce outputs of a predetermined dimension d, such as 512.

Figure 12:
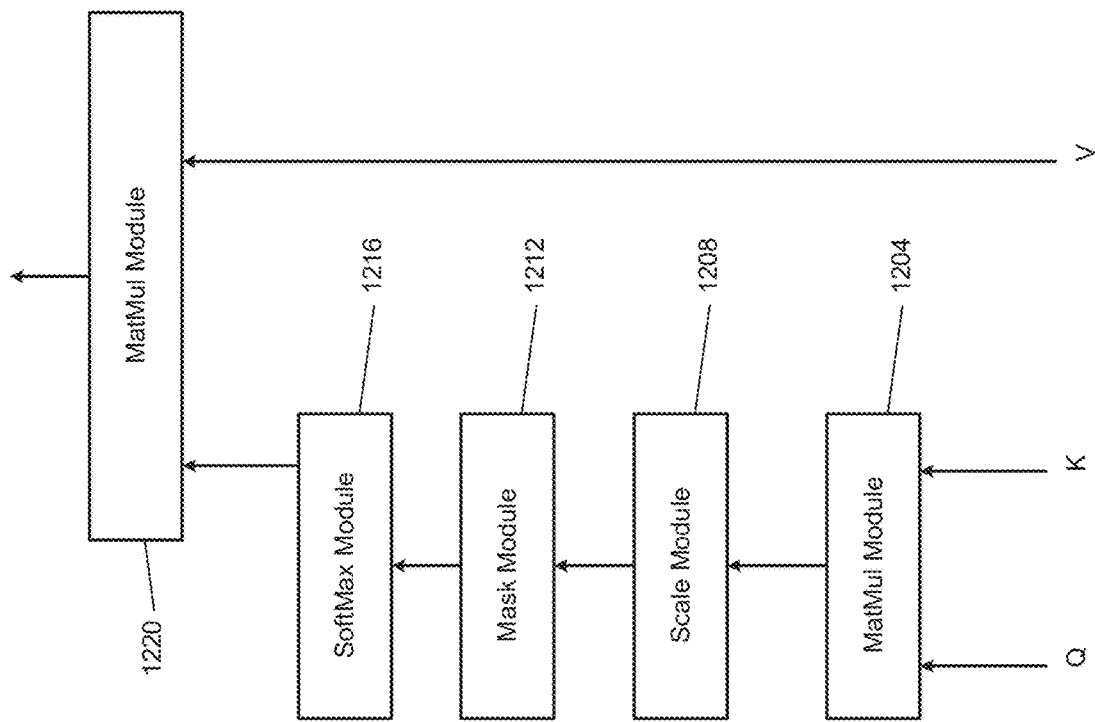
FIG. 12 includes a functional block diagram of an example implementation of a scaled dot-product attention module of the multi-head attention module.
Figure 11:
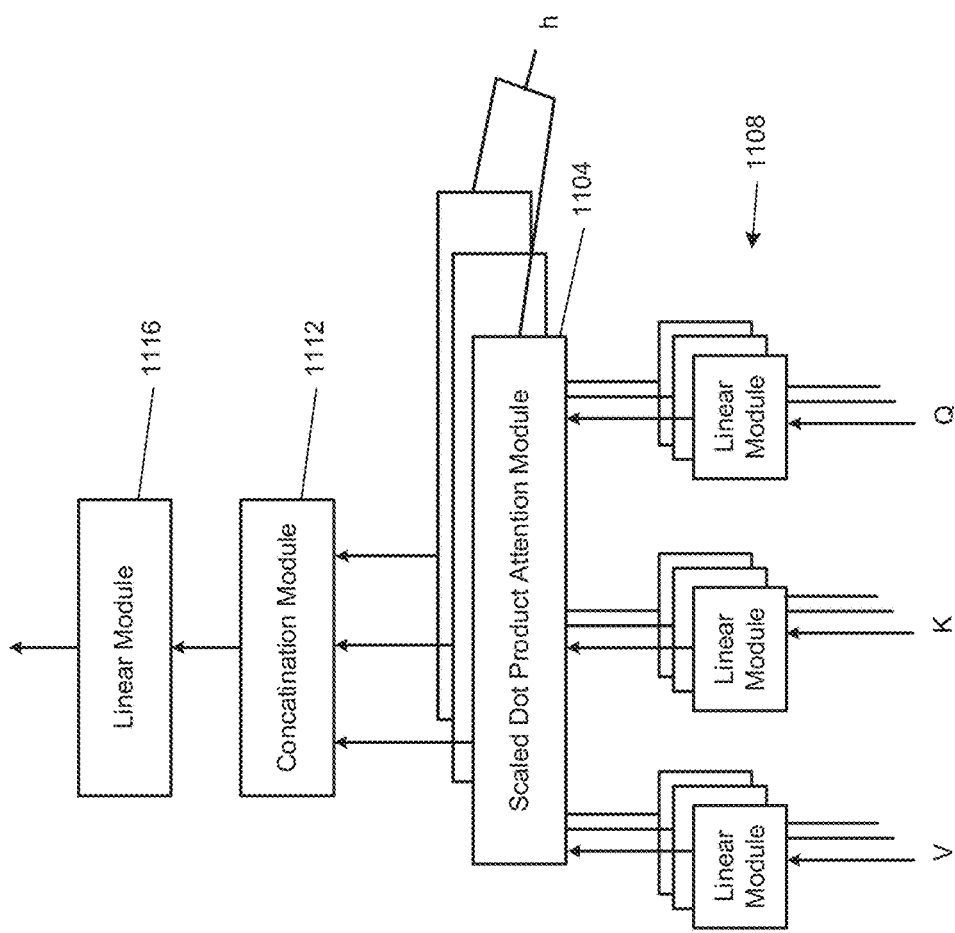
FIG. 11 includes a functional block diagram of an example implementation of a multi-head attention module.

FIG. 11 includes a functional block diagram of an example implementation of the multi-head attention module 1004. FIG. 12 includes a functional block diagram of an example implementation of a scaled dot-product attention module 1104 of the multi-head attention module 1004.

Regarding attention (performed by the multi-head attention module 1004), an attention function may function by mapping a query and a set of key-value pairs to an output, where the query, keys, values, and output are all vectors or matrices. The output may be computed as a weighted sum of the values, where the weight assigned to each value is computed by a compatibility function of the query with the corresponding key.

In the scaled dot-product attention module of FIG. 12, the input includes queries and keys of dimension $d_k$, and values of dimension $d_v$. The scaled dot-product attention module 1104 computes dot products of the query with all keys, divides each by $\sqrt{d_k}$, and applies a softmax function to obtain weights on the values.

The scaled dot-product attention module 1104 may compute the attention function on a set of queries simultaneously arranged in a matrix Q. The keys and values may also be held in matrices K and V. The scaled dot-product attention module 1104 may compute the matrix of outputs based on or using the equation:

$$\text{Attention}(Q, VK, V) = \text{softmax}\left(\frac{QK^T}{\sqrt{d_k}}\right)V.$$

The attention function may be, for example, additive attention or dot-product (multiplicative) attention. Dot-product attention may be used in addition to scaling using a scaling factor of $$\frac{1}{\sqrt{d_k}}.$$

Additive attention computes a compatibility function using a feed-forward network with a single hidden layer. Dot-product attention may be faster and more space-efficient than additive attention.

Instead of performing a single attention function with d-dimensional keys, values and queries, the multi-head attention module 1004 may linearly project the queries, keys, and values h times with different, learned linear projections to dimensions, respectively, using linear modules 1108. On each of the projected versions of queries, keys, and values the attention function may be performed in parallel, yielding $d_v$-dimensional output values. These may be concatenated and projected again, resulting in the final values, by a concatenation module 1112 and a linear module 1116 as shown.

Multi-head attention allows the solver module 610 to jointly attend to information from different representation subspaces at different positions. With a single attention head, averaging may inhibit this feature.

$$\text{Multihead}(Q, K, V) = \text{Concat}(\text{head}1, \ldots, \text{head}h)W^O,$$

where $\text{head}i = \text{Attention}(QW_i^Q, KW_i^K, VW_i^V),$ where the projection parameters are matrices $W_i^Q \in \mathbb{R}^{d \times Q}$, $W_i^K \in \mathbb{R}^{d \times d_k}$, $W_i^V \in \mathbb{R}^{d \times d_v}$ and $W^O \in \mathbb{R}^{hd_v \times d}$. h may be 8 parallel attention layers or heads. For each, dk=dv=d/h=64.

Multi-head attention may be used in different ways. For example, in the encoder attention layers, the queries come from the previous layer, and the memory keys and values come from the output of the encoder. This may allow every position in the encoder to attend over all positions in the input sequence.

The encoder may include self-attention layers. In a self-attention layer all of the keys, values, and queries come from the same place, in this case, the output of the previous layer in the encoder. Each position in the encoder can attend to all positions in the previous layer of the encoder.

Self-attention layers in the encoder module may be configured to allow each position in the encoder to attend to all positions in the encoder up to and including that position. Leftward information flow may be prevented in the encoder to preserve the auto-regressive property. This may be performed in the scaled dot-product attention by masking out (setting to 1) all values in the input of the softmax which may correspond to illegal connections.

Regarding the position wise feed forward module 1008, each may include two linear transformations with a rectified linear unit (ReLU) activation between.

$$\text{FFN}(x) = \max(0, xW_1 + b_1)W_2 + b_2$$

While the linear transformations may be the same across different positions, they use different parameters from layer to layer. This may also be described as performing two convolutions with kernel size 1. The dimensionality of input and output may be d=512, and the inner-layer may have dimensionality $d_{ff}=2048$.

Regarding the embedding and softmax functions, learned embeddings may be used to convert input tokens and output tokens to vectors of dimension d. The learned linear transformation and softmax function may be used to convert the decoder output to predicted next-token probabilities. The same weight matrix between the two embedding layers and the pre-softmax linear transformation may be used. In the embedding layers, the weights may be multiplied by $\sqrt{d}$.

Regarding the positional encoding, some information may be injected regarding relative or absolute position of the tokens in a sequence. Thus, the positional encodings may be added to the input embeddings at the bottoms of the encoder stack. The positional encodings may have the same dimension d as the embeddings, so that the two can be added. The positional encodings may be, for example, learned positional encodings or fixed positional encodings.

As shown in FIG. 12, a MatMul module 1204 generates an output based on the query Q and key K values using the MatMul function. A scale module 1208 may scale the output of the MatMul module 1204 by one or more predetermined scalar values. A mask module 1212 may mask one or more portions of the output of the scale module 1208 to produce an output. In various implementations, the mask module 1212 may be omitted.

A SoftMax module 1216 may apply the softmax function to the output of the mask module 1212. A MatMul module 1220 generates an output to the concatenation module 1112 based on the output of the SoftMax module 126 and the value V using the MatMul function.

Figure 13:
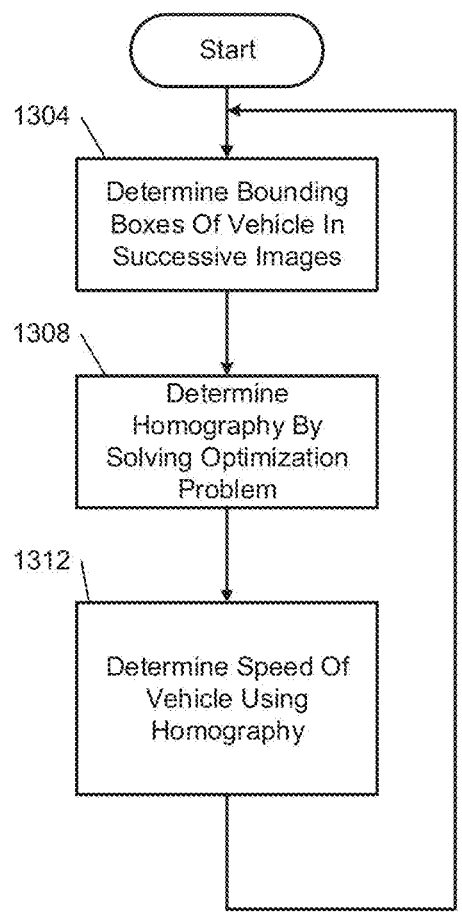
FIG. 13 is a flowchart depicting an example method of determining a vehicle speed on the road in the field of view (FOV) of a camera.

FIG. 13 is a flowchart depicting an example method of determining a vehicle speed and generating the homography of the road in the FOV of a camera. Control begins with 1304 where the vehicle detection module 604 determines bounding boxes of an object (e.g., a vehicle) in image frames, respectively, of video from the camera.

At 1308, the solver module 610 determines the homography using the optimization algorithm (e.g., Gaussian) based on the bounding boxes. The solver module 610 may filter the homography before outputting the homography for vehicle speed estimation. The solver module 610 may also update one or more parameters of the optimization algorithm.

At 1312, the speed module 612 determines a speed of the vehicle using the homography. As discussed above, the speed estimation module 108 may determine the speed of each vehicle in the frame. The speed estimation module 108 may average the instantaneous speeds of the vehicle over a period to determine an average speed of the vehicle and/or average the instantaneous speeds of multiple different vehicles to determine an average speed of the multiple vehicles.

Advantageously the disclosed systems and methods are adapted to estimate the speed of objects that appear in videos without the need of camera calibration and may be used independent of the camera used to record video with objects traveling in the frame of view. For example, the disclosed systems and methods may be used to determine the speed of objects traveling in video depicting a virtual environment.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A speed estimation system, comprising:
    a detection module configured to determine bounding boxes of an object moving on a surface in images, respectively, captured using a camera;
    a solver module configured to, based on the bounding boxes, determine a homography of the surface by solving an optimization problem,
    wherein the solver module is not trained; and
    a speed module configured to, using the homography, determine a speed that the object is moving on the surface.

2. The speed estimation system of claim 1 wherein the solver module configured to determine the homography using an optimization algorithm.

3. The speed estimation system of claim 2 wherein the optimization algorithm is configured based on an assumption that the surface is planar.

4. The speed estimation system of claim 2 wherein the optimization algorithm is configured based on an assumption that pixels of the images are square.

5. The speed estimation system of claim 2 wherein the optimization algorithm is configured based on an assumption that images captured by the camera do not have horizontal skew and do not have vertical skew.

6. The speed estimation system of claim 2 wherein the optimization algorithm is configured based on an assumption that a principal point is at a center of the image.

7. The speed estimation system of claim 2 wherein the optimization algorithm is configured based on an assumption of zero roll of the camera.

8. The speed estimation system of claim 1 wherein the solver module includes a plurality of encoder modules configured to determine the homography.

9. The speed estimation system of claim 8 wherein the encoder modules have the Transformer architecture.

10. The speed estimation system of claim 1 wherein the solver module is configured to filter the homography before the homography is used to determine the speed that the object is moving on the surface.

11. The speed estimation system of claim 1 wherein the object is a vehicle.

12. A speed estimation method, comprising:
    determining bounding boxes of an object moving on a surface in images, respectively, captured using a camera;
    without training, based on the bounding boxes, determining a homography of the surface by solving an optimization problem; and
    using the homography, determine a speed that the object is moving on the surface.

13. The speed estimation method of claim 12 wherein determining the homography includes determining the homography using an optimization algorithm.

14. The speed estimation method of claim 13 wherein the optimization algorithm is configured based on an assumption that the surface is planar.

15. The speed estimation method of claim 13 wherein the optimization algorithm is configured based on an assumption that pixels of the images are square.

16. The speed estimation method of claim 13 wherein the optimization algorithm is configured based on an assumption that images captured by the camera do not have horizontal skew and do not have vertical skew.

17. The speed estimation method of claim 13 wherein the optimization algorithm is configured based on an assumption that a principal point is at a center of the image.

18. The speed estimation method of claim 13 wherein the optimization algorithm is configured based on an assumption of zero roll of the camera.

19. The speed estimation method of claim 12 wherein determining the homography includes determining the homography using a plurality of encoder modules configured to determine the homography.

20. The speed estimation method of claim 19 wherein the encoder modules have the Transformer architecture.

21. The speed estimation method of claim 12 further comprising filtering the homography before the homography is used to determine the speed that the object is moving on the surface.

22. A speed estimation system, comprising:
- a means for determining bounding boxes of an object moving on a surface in images, respectively, captured using a camera;
- an untrained means for, based on the bounding boxes, determining a homography of the surface by solving an optimization problem; and
- a means for, using the homography, determining a speed that the object is moving on the surface.

* * * * *